US008451164B2

(12) United States Patent
Dowla et al.

(10) Patent No.: US 8,451,164 B2
(45) Date of Patent: May 28, 2013

(54) RADAR NETWORK COMMUNICATION THROUGH SENSING OF FREQUENCY HOPPING

(75) Inventors: Farid Dowla, Castro Valley, CA (US); Faranak Nekoogar, San Ramon, CA (US)

(73) Assignee: Lawrence Livermore National Security, LLC., Livermore, CA (US)

( * ) Notice: Subject to any disclaimer, the term of this patent is extended or adjusted under 35 U.S.C. 154(b) by 303 days.

(21) Appl. No.: 13/024,105

(22) Filed: Feb. 9, 2011

(65) Prior Publication Data
US 2012/0200448 A1    Aug. 9, 2012

(51) Int. Cl.
*G01S 13/00* (2006.01)
(52) U.S. Cl.
USPC .................................. 342/59; 342/61; 342/73
(58) Field of Classification Search
USPC ........................ 342/59, 61, 73–103
See application file for complete search history.

(56) References Cited

U.S. PATENT DOCUMENTS

| 8,237,602 B2 * | 8/2012 | Huneycutt, Sr. ................ 342/13 |
| 2008/0007455 A1 | 1/2008 | Leach, Jr. et al. |

FOREIGN PATENT DOCUMENTS

WO    2008/020879 A2    2/2008

* cited by examiner

*Primary Examiner* — Timothy A Brainard
(74) *Attorney, Agent, or Firm* — Dominic M. Kotab

(57) ABSTRACT

In one embodiment, a radar communication system includes a plurality of radars having a communication range and being capable of operating at a sensing frequency and a reporting frequency, wherein the reporting frequency is different than the sensing frequency, each radar is adapted for operating at the sensing frequency until an event is detected, each radar in the plurality of radars has an identification/location frequency for reporting information different from the sensing frequency, a first radar of the radars which senses the event sends a reporting frequency corresponding to its identification/location frequency when the event is detected, and all other radars in the plurality of radars switch their reporting frequencies to match the reporting frequency of the first radar upon detecting the reporting frequency switch of a radar within the communication range. In another embodiment, a method is presented for communicating information in a radar system.

18 Claims, 4 Drawing Sheets

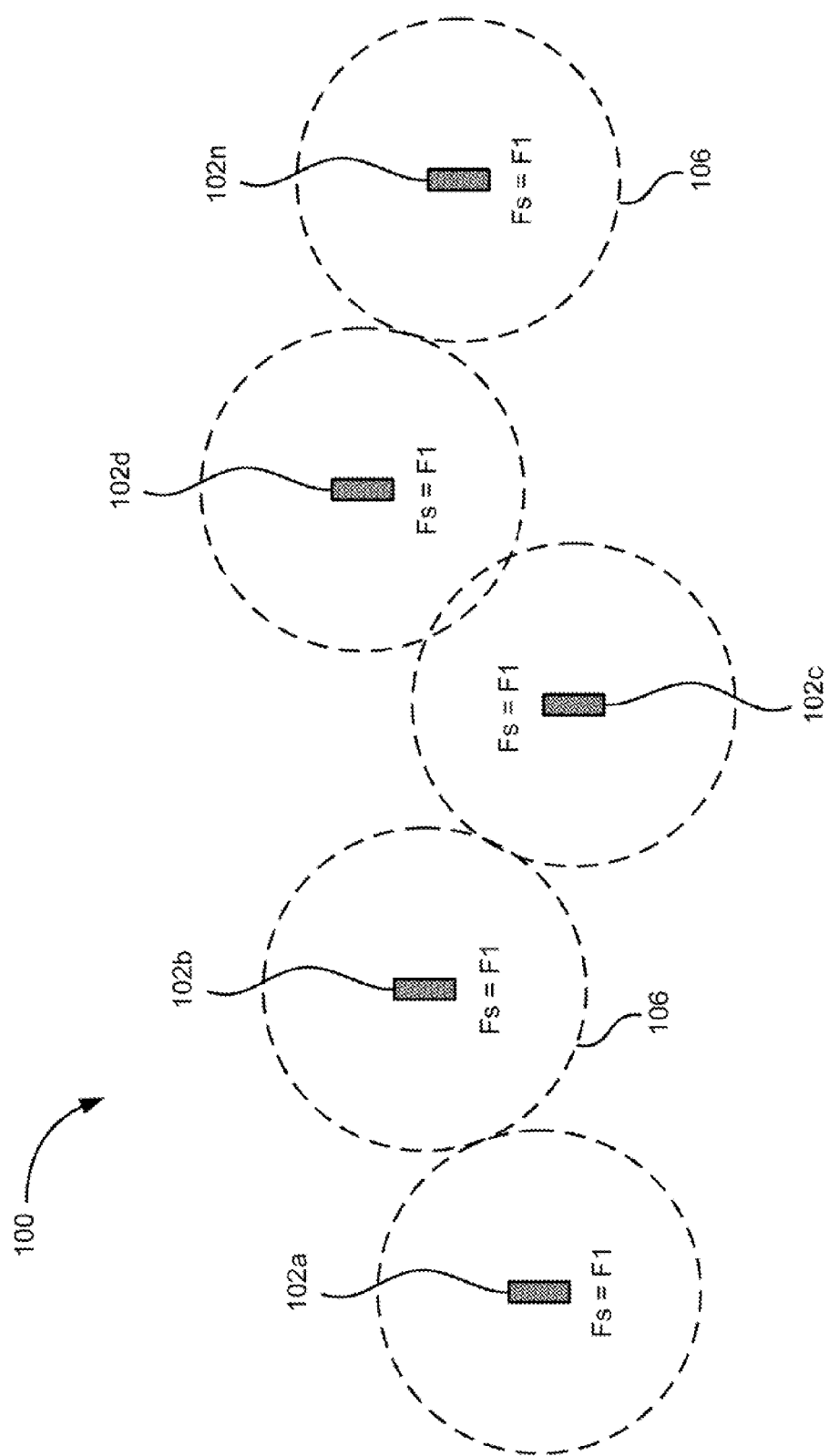

RADAR NETWORK COMMUNICATION THROUGH SENSING OF FREQUENCY HOPPING

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

The present invention relates to radar network communications, and particularly, to radar network communications through sensing of frequency hopping.

BACKGROUND

For wireless sensor networks, there is usually a dedicated communications system to transfer sensor data to a destination node on the network. This communication system usually requires a substantial amount of power and needs to follow various wireless protocols, such as wireless local area network (WLAN) protocols, to transmit and receive information between the nodes. The largest amount of power consumed by these communication systems that are currently used in sensor networking solutions is generally consumed when the communication systems are continuously listening for data. There is currently no radar networking system that provides sensed data and the location of an event without any communications system.

Accordingly, it would be beneficial to have a radar networking system that did not have a power hungry dedicated communications system with which to transfer sensor data between nodes on the network.

SUMMARY

In one embodiment, a radar communication system includes a plurality of radars having a communication range and being capable of operating at a sensing frequency and a reporting frequency, wherein the reporting frequency is different than the sensing frequency, each radar is adapted for operating at the sensing frequency until an event is detected, each radar in the plurality of radars has an identification/location frequency for reporting information different from the sensing frequency, a first radar of the radars which senses the event sends a reporting frequency corresponding to its identification/location frequency when the event is detected, and all other radars in the plurality of radars switch their reporting frequencies to match the reporting frequency of the first radar upon detecting the reporting frequency switch of a radar within the communication range.

In another embodiment, a method of communicating information in a radar system includes detecting an event using a first radar operating at a sensing frequency, switching a reporting frequency of the first radar from a reporting frequency to an identification/location frequency, detecting the identification/location frequency sent by the first radar using a second radar operating at the sensing frequency, switching a reporting frequency of the second radar to match the identification/location frequency of the first radar, and determining that the event occurred in an operating range of the first radar based on the second radar's reporting frequency being switched to the identification/location frequency of the first radar.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIGS. 1A-1C show a radar communication system and operation thereof, according to one embodiment.

DETAILED DESCRIPTION

Figure 1B:
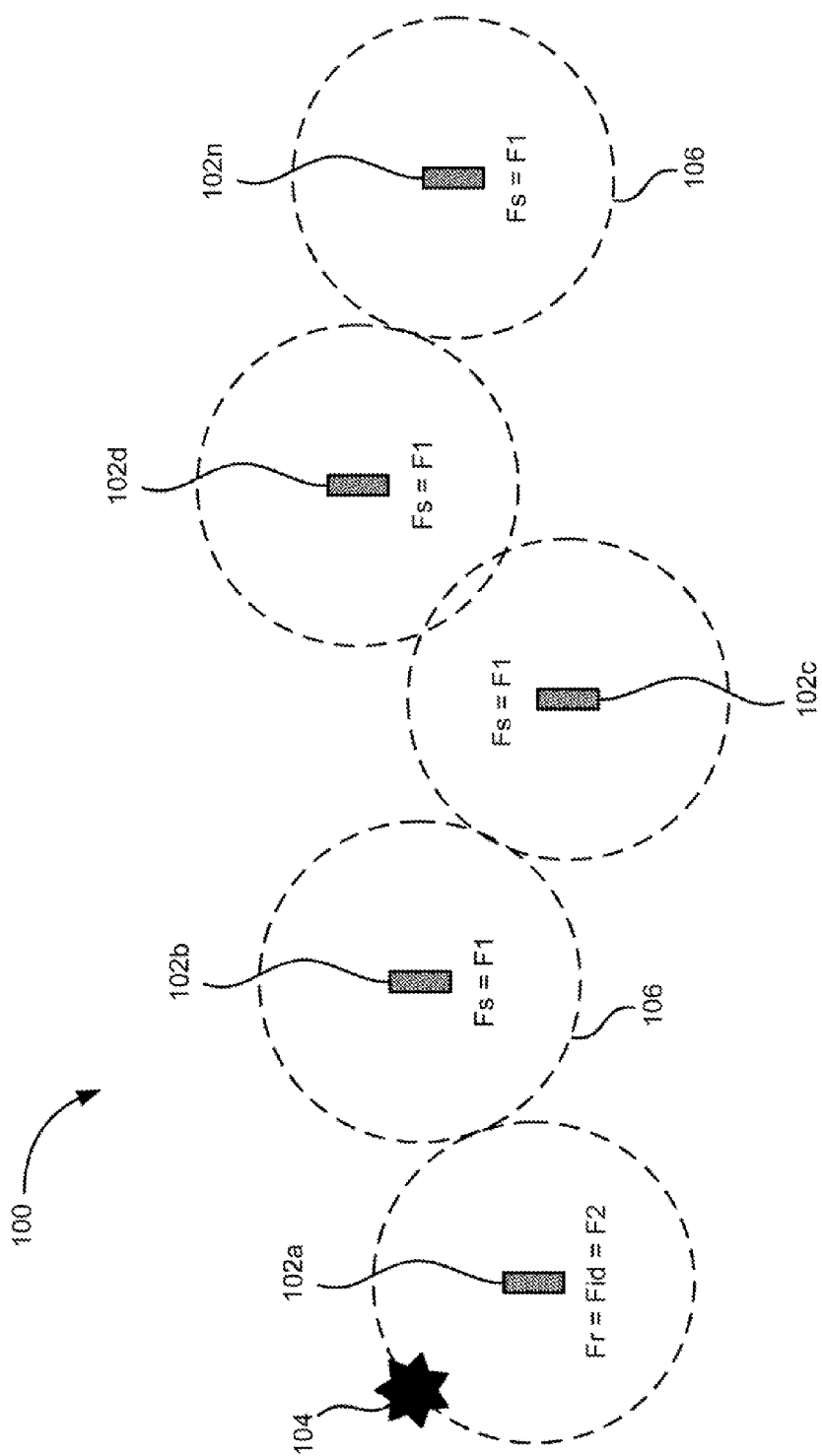

The following description is made for the purpose of illustrating the general principles of the present invention and is not meant to limit the inventive concepts claimed herein. Further, particular features described herein, including any incorporated description, can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

Various embodiments of the present invention described herein include a method for transferring data from multiple sensors in a network to a destination node using radar communications. In this method, there is no dedicated communications system or protocols and radars (radar systems) communicate in a network by changing frequencies as the radars sense. In addition to transferring the sensed data to a final destination node, the location of the detected or sensed event may also be identified by diffusion and without an explicit communications or network system. The radars used in this network may be used as a motion detector, a change detector, etc., with an ultra-wideband or a narrowband signaling scheme. These radars may also be integrated with a variety of sensors, such as temperature, pressure, Hall Effect (HE), biological presence, etc. It is noted that once an event is detected, the location of the event and the data may be transmitted to the destination node without a separate wireless or wired communications system or protocol. This method of transferring sensor data is very low cost and may use a limited form factor.

In one general embodiment, a radar communication system includes a plurality of radars having a communication range and being capable of operating at a sensing frequency and a reporting frequency, wherein the reporting frequency is different than the sensing frequency, each radar is adapted for operating at the sensing frequency until an event is detected, each radar in the plurality of radars has an identification/location frequency for reporting information different from the sensing frequency, a first radar of the radars which senses the event sends a reporting frequency corresponding to its identification/location frequency when the event is detected, and all other radars in the plurality of radars switch their reporting frequencies to match the reporting frequency of the first radar upon detecting the reporting frequency switch of a radar within the communication range.

In another general embodiment, a method of communicating information in a radar system includes detecting an event using a first radar operating at a sensing frequency, switching a reporting frequency of the first radar from a reporting frequency to an identification/location frequency, detecting the identification/location frequency sent by the first radar using a second radar operating at the sensing frequency, switching a reporting frequency of the second radar to match the identification/location frequency of the first radar, and determining that the event occurred in an operating range of the first radar based on the second radar's reporting frequency being switched to the identification/location frequency of the first radar.

According to one embodiment, a plurality of radars form various nodes of a network are positioned relative to one another such that a chain of communication may be established from a first radar at a first end of the plurality of radars to a second radar at a second end of the plurality of radars. This communication may occur without any specific communication protocol in some approaches. In this network of radars, each node (radar) has a sensing frequency (Fs), an identification/location frequency (Fid) which defines the location of the radar, and a reporting frequency (Fr). When a radar senses an event, it begins communicating on its reporting frequency (Fr), which for that radar is the identification/location frequency (Fid), e.g., (Fr=Fid). By sensing with one frequency (Fs), and communicating with another frequency (Fr), the entire radar network may be made aware of an event sensed by a single radar, by causing each radar in the network to change frequency and communicate on a reporting frequency which matches that of the sensing radar, e.g., each radar's reporting frequency is switched to the to the identification/location frequency (Fid) of the sensing radar. Therefore, the data and the event's location may be passed throughout the network with no additional communications unit(s) beyond the plurality of radars.

Figure 1C:
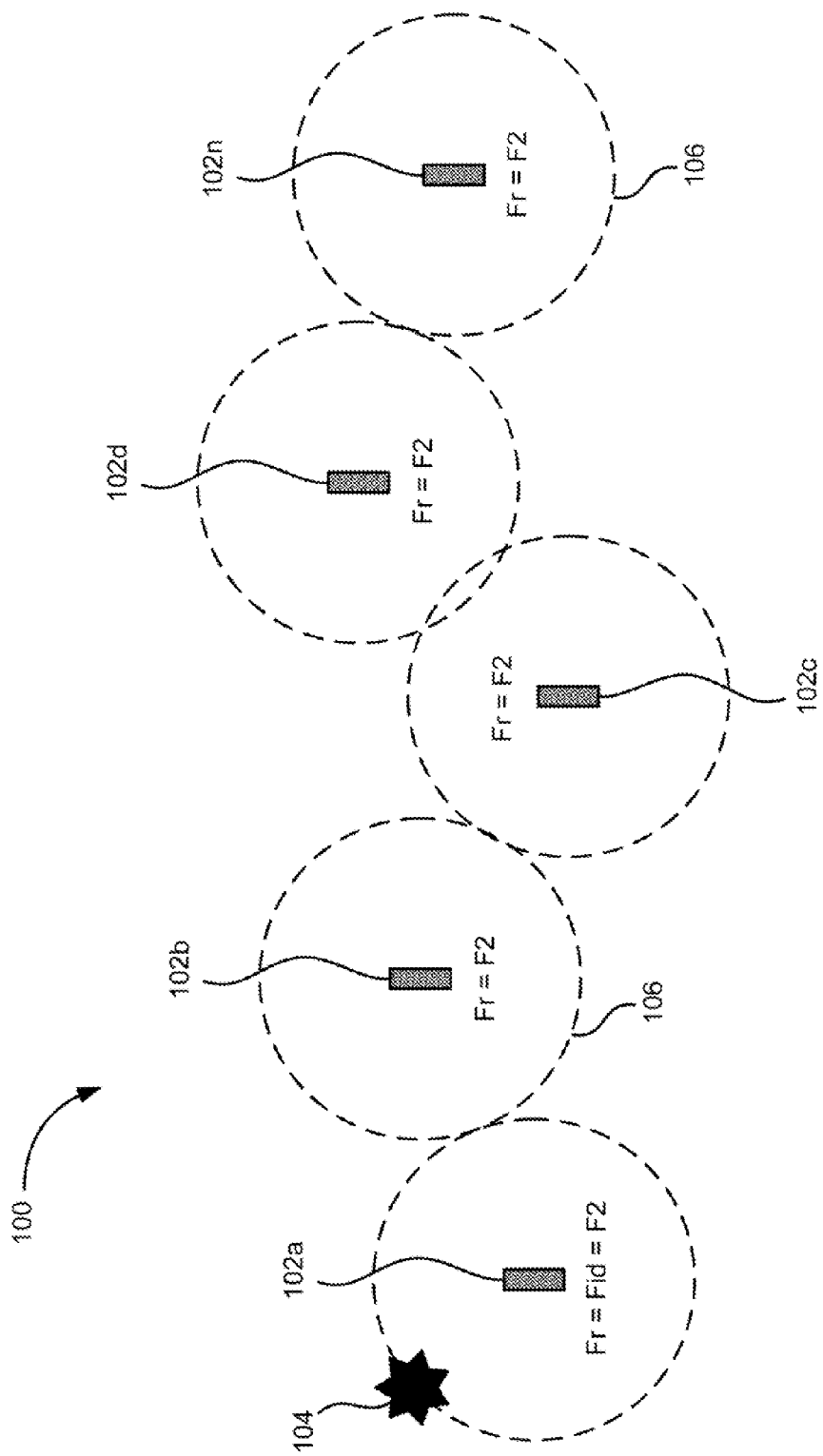

Now referring to FIGS. 1A-1C, a radar communication system 100 and operation thereof is described according to one embodiment. The radar system 100 includes a plurality of radars 102a, 102b, 102n, with each radar having a maximum communication range 106. As shown in FIG. 1A, the plurality of radars 102a, 102b, . . . , 102n are positioned in a daisy-chain arrangement such that each radar is within the maximum communication range 106 of two other radars (neighbor nodes). However, as would be apparent to one of skill in the art upon reading the present descriptions, any other arrangement of radars is possible as long as the communication between the radars is possible.

Each radar 102a, 102b, . . . , 102n operates at a sensing frequency (Fs) when the plurality of radars 102a, 102b, . . . , 102n are attempting to detect an event (e.g., sensing a change, a movement, a loss of something being sensed, etc.), and a reporting frequency (Fr) when relaying information between nodes (radars) on the radar network. Any type of event may be detected as would be known to one of skill in the art. For example, some illustrative events include conditional changes, environmental changes, motion changes, etc. Some illustrative conditions and/or environments include temperature, pressure, HE, Biological presence, etc.

According to various embodiments, the radars 102a, 102b, . . . , 102n may be used as detectors in many different ways as would be known to one of skill in the art. Some of the ways in which the radars 102a, 102b, . . . , 102n and the radar communication system 100 may be used as detectors are described in U.S. Patent Publication No. 2008/0007445, which is herein incorporated by reference. For example, various parts, descriptions, components, methods, etc., from U.S. Patent Publication No. 2008/0007445 may be used in any embodiments described herein, as would be apparent to one of skill in the art upon reading the present description.

According to one embodiment, the sensing frequency (Fs) may be set to any desired frequency, and may be based on any factor, such as the event trying to be detected, the conditions of the sensing, the range of the radar, etc. Initially, for sake of this description, the sensing frequency (Fs) may be set to a desired detection frequency or frequency range, denoted as F1 (1 GHz, for example). According to one embodiment, the desired detection frequency (F1) and any other frequencies described herein may be ultra-wide band. According to more embodiments, the desired detection frequency (F1) and any other frequencies described herein may be narrowband, impulse, continuous wave, etc., depending on the application for which the radar communication system 100 is being used.

Now referring to FIG. 1B, it is assumed that a detectable event 104 has occurred, which is detected by radar 102a. Radar 102a, in response to detecting the event 104, changes its frequency from the sensing frequency (Fs=F1) to the radar's predetermined identification/location frequency (Fr=Fid), which, for description purposes may be denoted as F2. Each radar in the plurality of radars may have a unique identification/location frequency, which may represent a location of the radar and may identify the radar.

According to another embodiment, each radar in the plurality of radars may have a unique identification/location frequency range from which a plurality of frequencies represent a plurality of events. For example, a frequency range may be predetermined for each radar in the plurality of radars, and setting a reporting frequency of a first radar to one of its preselected frequencies within its predetermined reporting frequency range may indicate a specific'type of event, such as movement, conditional change (temperature, pressure, etc.), etc. This way, the type of event that a radar has detected may be known based on the reporting frequency of the radar system 100.

Radar 102b, in response to radar 102a changing its reporting frequency (Fr) to its identification/location frequency (Fr=Fid=F2), also switches its reporting frequency (Fr) to match that of sensing radar 102a, e.g., (Fr=F2). This process is repeated for each radar in the plurality of radars 102a, 102b, . . . , 102n until each radar is operating at the identification/location frequency (Fid=F2) of radar 102a, as shown in FIG. 1C. For example, all other radars in the plurality of radars may switch its reporting frequency (Fr) to match the reporting frequency of the first radar 102a upon detecting a switch in a reporting frequency of a radar within the maximum communication range 106, e.g., a closest radar.

A great advantage to this radar communication system 100 is that since the system 100 does not include or use a dedicated communications system with which to communicate information (event and/or location information) from one node to another node, the radar communication system 100 provides a lower power and lower cost solution as compared to prior art systems.

According to another approach, no communication device other than radars 102a, 102b, . . . , 102n may be present in the system 100 or used to communicate information to/from the radars 102a, 102b, . . . , 102n. For example, there is no WLAN, wireless devices, Global Positioning Satellite (GPS) devices, etc., that are used to communicate information from one radar to another radar, according to one embodiment.

In an alternate embodiment, a backup communication device or devices may be present in the radar communication system 100, such as a WLAN and associated communication devices, GPS devices, wireless transmitters and receivers, etc., that may be inactive and/or in a low power or no power state during normal operation of the radar communication system 100. However, in the event that one or more radars 102a, 102b, ..., 102n fails and/or is incapable of transmitting a reporting frequency (Fr), the backup communication device may be used to send information to another radar within the failed radar's communication range. The other radar can then use its reporting frequency (Fr) to continue sending the information as described above. This embodiment is illustrative and not meant to be limiting on the invention in any way.

Figure 2:
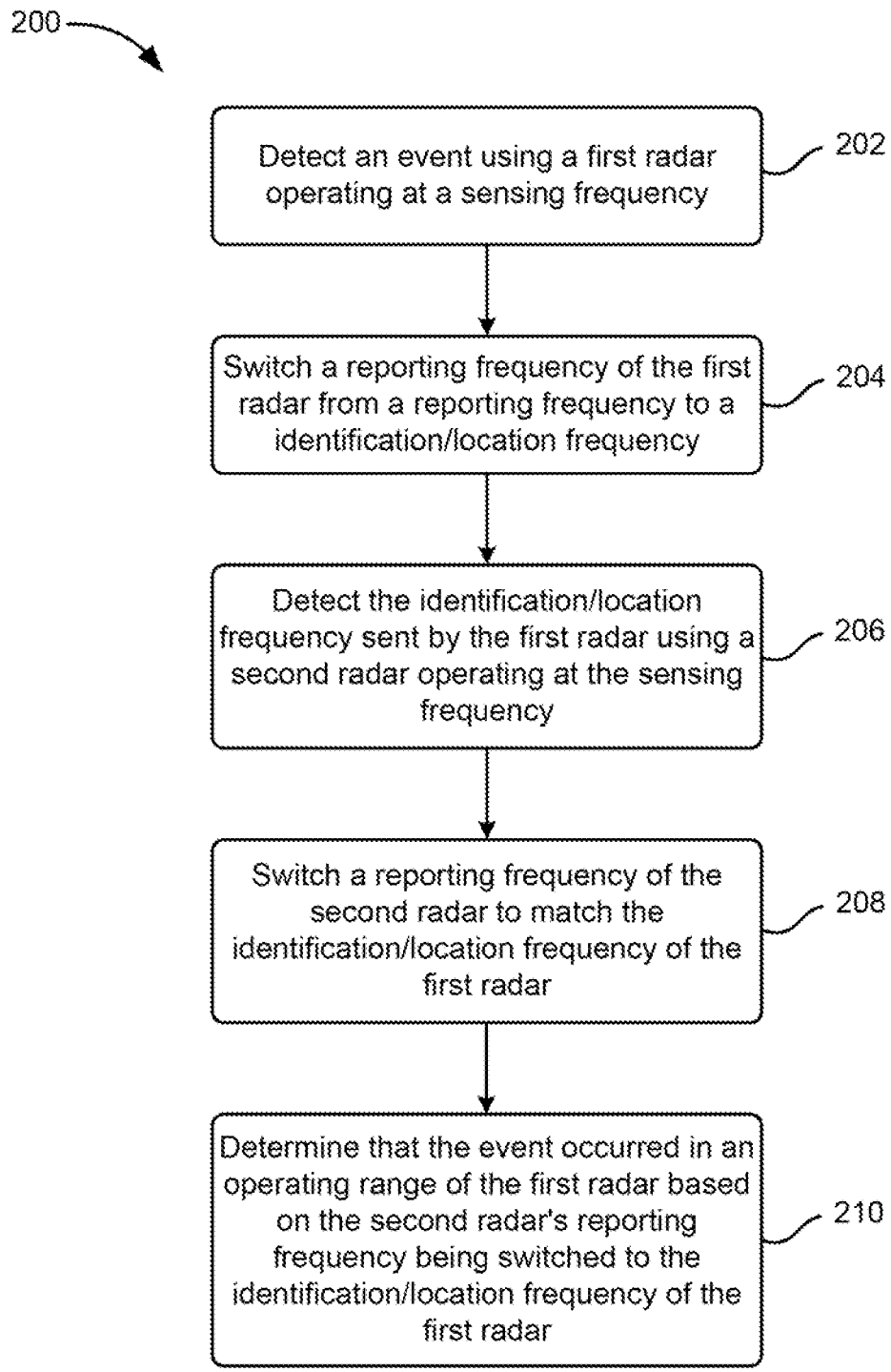
FIG. 2 is a flowchart of a method for communicating information in a radar system, according to one embodiment.

Now referring to FIG. 2, a method 200 for communicating information in a radar system is shown according to one embodiment. The method 200 may be carried out in any desired environment, and may include more or less operations than those described below.

In operation 202, an event is detected using a first radar operating at a sensing frequency.

In operation 204, a reporting frequency of the first radar is switched from a reporting frequency to a identification/location frequency.

In operation 206, the identification/location frequency sent by the first radar is detected using a second radar operating at the sensing frequency.

In operation 208, a reporting frequency of the second radar is switched to match the identification/location frequency of the first radar.

In operation 210, it is determined that the event occurred in an operating range of the first radar based on the second radar's reporting frequency being switched to the identification/location frequency of the first radar.

According to various embodiments, the first and second radars may be adapted for operating at any conventional frequency including ultra-wide band frequencies, at narrowband frequencies such as those within a conventional frequency range, with impulse frequencies, with continuous wave frequencies, etc.

In another embodiment, the first and second radars may each have a unique identification/location frequency which represents a location of the radar and identifies the radar: In addition, the first and second radars may each have a unique identification/location frequency range from which a plurality of frequencies represent a plurality of events.

In one approach, a reporting frequency of a plurality of radars positioned in a daisy-chain arrangement between the first radar and the second radar may be switched such that the first radar may cause the reporting frequency of the second radar to be switched by causing the reporting frequency of each radar in the daisy-chain to switch, wherein each radar is within a maximum communication range of two other radars.

According to another approach, no communication device other than radars may be present in the system or used to communicate information from the radars. For example, there is no WLAN, wireless devices, Global Positioning Satellite (GPS) devices, etc., that are used to communicate information from one radar to another radar.

With embodiments described herein, the radar communication system may be used as a detection system which is capable of communicating an event without a dedicated communication system, which saves on infrastructure and power. In addition, the radar detection system may be used for border security, intrusion detection, change detection, radar sensing, and radar communication, among other uses known to one of skill in the art.

While various embodiments have been described above, it should be understood that the embodiments have been presented by way of example only, and are in no way limiting on the scope of the invention. Thus, the breadth and scope of a preferred embodiment should not be limited by any of the above-described exemplary embodiments, but should be defined only in accordance with the following claims and their equivalents.

What is claimed is:

1. A radar communication system, comprising:
    a plurality of radars having a communication range and operating at a sensing frequency and a reporting frequency,
    wherein the reporting frequency is different than the sensing frequency,
    wherein each radar is adapted for operating at the sensing frequency until an event is detected,
    wherein each radar in the plurality of radars has an identification/location frequency for reporting information different from the sensing frequency,
    wherein a first radar of the radars which senses the event sends a reporting frequency corresponding to its identification/location frequency when the event is detected, and
    wherein all other radars in the plurality of radars switch their reporting frequencies to match the reporting frequency of the first radar upon detecting the reporting frequency switch of a radar within the communication range.

2. The radar communication system as recited in claim 1, wherein the plurality of radars are adapted for operating at ultra-wide band frequencies.

3. The radar communication system as recited in claim 1, wherein the plurality of radars are adapted for operating at narrowband frequencies.

4. The radar communication system as recited in claim 1, wherein the plurality of radars are adapted for operating with impulse frequencies.

5. The radar communication system as recited in claim 1, wherein the plurality of radars are adapted for operating with continuous wave frequencies.

6. The radar communication system as recited in claim 1, wherein each radar has a unique identification/location frequency which represents a location of the radar and identifies the radar.

7. The radar communication system as recited in claim 1, wherein each radar has a unique identification/location frequency range from which a plurality of frequencies represent a plurality of events.

8. The radar communication system as recited in claim 1, wherein the plurality of radars are positioned in a daisy-chain arrangement such that each radar is within the maximum communication range of two other radars.

9. The radar communication system as recited in claim 1, with the proviso that no communication device other than the plurality of radars is present in the system or used to communicate information from the plurality of radars.

10. A method of communicating information in a radar system, the method comprising:
    detecting an event using a first radar operating at a sensing frequency;
    switching a reporting frequency of the first radar from a reporting frequency to an identification/location frequency;
    detecting the identification/location frequency sent by the first radar using a second radar operating at the sensing frequency;
    switching a reporting frequency of the second radar to match the identification/location frequency of the first radar; and
    determining that the event occurred in an operating range of the first radar based on the second radar's reporting frequency being switched to the identification/location frequency of the first radar.

11. The method as recited in claim 10, wherein the first and second radars are adapted for operating at ultra-wide band frequencies.

12. The method as recited in claim 10, wherein the first and second radars are adapted for operating at narrowband frequencies.

13. The method as recited in claim 10, wherein the first and second radars are adapted for operating with impulse frequencies.

14. The method as recited in claim 10, wherein the first and second radars are adapted for operating with continuous wave frequencies.

15. The method as recited in claim 10, wherein the first and second radars each have a unique identification/location frequency which represents a location of the radar and identifies the radar.

16. The method as recited in claim 10, wherein the first and second radars each have a unique identification/location frequency range from which a plurality of frequencies represent a plurality of events.

17. The method as recited in claim 10, further comprising switching a reporting frequency of a plurality of radars positioned in a daisy-chain arrangement between the First radar and the second radar such that the first radar may cause the reporting frequency of the second radar to be switched by causing the reporting frequency of each radar in the daisy-chain to switch, wherein each radar is within a maximum communication range of two other radars.

18. The method as recited in claim 10, with the proviso that no communication device other than radars is present in the system or used to communicate information from the radars.

* * * * *